United States Patent Office 3,255,228
Patented June 7, 1966

3,255,228
HALOGENATED ALKYL CHLOROSULFATES AND
FLUOROSULFATES
Murray Hauptschein, Glenside, Pa., and Milton Braid,
Haddon Heights, N.J., assignors to Pennsalt Chemicals
Corporation, Philadelphia, Pa., a corporation of Pennsylvania
No Drawing. Filed Sept. 20, 1963, Ser. No. 310,442
8 Claims. (Cl. 260—456)

This application is a continuation-in-part of copending application Serial No. 735,702, now abandoned filed May 16, 1958, by Murray Hauptschein and Milton Braid for Halogenated Organic Compounds.

This invention relates to fluorinated chlorosulfates and fluorosulfates of the general formula $$RCY_2CH_2CX_2OSO_2X$$

where R may be fluorine, chlorine, a perfluoroalkyl group, a perfluorochloroalkyl group, a perfluorohydroalkyl group or a perfluorochlorohydroalkyl group; where X may be chlorine or fluorine; and where Y may be chlorine, fluorine or a perfluoroalkyl radical. Preferably, where R is haloalkyl it will contain from 1 to about 50 and preferably from 1 to about 20 carbon atoms. Where Y is perfluoroalkyl it will contain from 1 to 6 carbon atoms and is preferably perfluoromethyl.

As used herein, perfluoroalkyl group means an alkyl group containing only the elements carbon and fluorine. A perfluorochloroalkyl group means an alkyl group containing only the elements fluorine, carbon and chlorine wherein the ratio of fluorine to chlorine atoms is at least 1:1. A perfluorohydroalkyl group means an alkyl group containing only the elements fluorine, hydrogen and chlorine in which the ratio of fluorine to hydrogen atoms is at least 1:1. A perfluorochlorohydroalkyl group means an alkyl group containing only the elements fluorine, chlorine, hydrogen and carbon in which the ratio of fluorine plus chlorine atoms to hydrogen atoms is at least 1:1. Expressed another way, the ration of halogen atoms to other non-carbon atoms of the halogen containing alkyl groups is at least 1:1.

The new halogenated chlorosulfates and fluorosulfates of the invention are prepared by a new route involving the reaction of cholorsulfonic acid or fluorosulfonic acid with a corresponding halogenated iodide of the formula $RCY_2CH_2CX_2I$ where R, Y and X are as defined above. In this reaction, the chlorosulfate $(OSO_2Cl)$ or fluorosulfate $(OSO_2F)$ group replaces the iodine to form the corresponding halosulfate with the halosulfate group $(OSO_2X)$ bonded to the carbon vacated by the iodine through an oxygen atom thus:

This reaction may be illustrated in the case of 1-iodo-2,2-dihydro-perfluoropentane, $CF_3CF_2CF_2CH_2CF_2I$ and chlorosulfonic acid by the following equation:

(1)

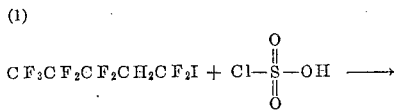

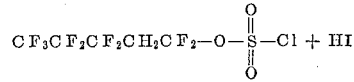

Iodine chlorides and sulfur dioxide are in general the inorganic products ultimately formed, probably as the result of the following reactions:

(2) $\quad ClSO_3H \rightleftharpoons SO_3 + HCl$ (3) $\quad SO_3 + 2HI \longrightarrow I_2 + SO_2 + H_2O$ (4) $\quad I_2 \xrightarrow{ClSO_3H} ICl, ICl_3,$ etc.

As will be shown in detail in the description which follows, the reaction of fluosulfonic and chlorosulfonic acid with these halogenated iodides produces the fluorosulfate or chlorosulfate, that is, compounds in which the sulfur of the fluosulfonic or chlorosulfonic acid is linked to a carbon atom through an oxygen atom

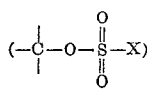

to the substantial exclusion of sulfonyl chlorides or fluorides

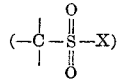

or sulfonic acids

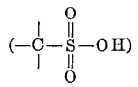

in which the sulfur of the chlorosulfonic group is linked directly to a carbon atom, and to the substantial exclusion also of sulfites.

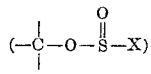

The stable halogenated chlorosulfates and fluorosulfates provided by the present invention are a valuable class of compounds. Because they are halosulfates, with the sulfur bonded to a dihalogenated carbon through an oxygen atom, rather than sulfonic acids in which the sulfur is bonded directly to the dihalogenated carbon, they undergo a series of unique one-step reactions with reagents such as water, ammonia, amines, alcohols and mercaptans to produce respectively perhalogenated carboxylic acids, amides, substituted amides, esters and thiolesters. The corresponding hydrocarbon chlorosulfates and fluorosulfates do not undergo these reactions. Reactions of these types, which are described in more detail in our co-pending applications Serial No. 272,533, filed April 12, 1963, for Preparation of Halogenated Organic Compounds; Serial No. 336,345, filed January 8, 1964, for Preparation of Halogenated Organic Compounds; Serial No. 335,673, filed January 3, 1964, for Preparation of Halogenated Organic Compounds; and Serial No. 336,344, filed January 8, 1964, for Preparation of Halogenated Organic Compounds; may be illustrated in the case of the chlorsulfate $CF_3CF_2CF_2CH_2CF_2OSO_2Cl$ by the following equations:

(5)
$CF_3CF_2CF_2CH_2CF_2OSO_2Cl + 3HOH \longrightarrow$

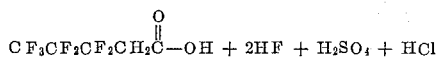

(6)
$CF_3CF_2CF_2CH_2CF_2OSO_2Cl + 3NH_3 \longrightarrow$

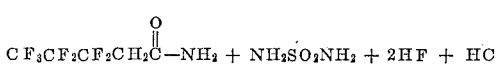

(7)

$CF_3CF_2CF_2CH_2CF_2OSO_2Cl + 3C_2H_5NH_2 \longrightarrow$ $CF_3CF_2CF_2CH_2\overset{O}{\overset{\|}{C}}NHC_2H_5 + C_2H_5NHSO_2NHC_2H_5 + 2HF + HCl$ (8)

$CF_3CF_2CF_2CH_2CF_2OSO_2Cl + 3HOC_2H_5 \longrightarrow$ $CF_3CF_2CF_2CH_2\overset{O}{\overset{\|}{C}}-OC_2H_5 + (C_2H_5O)_2SO_2 + 2HF + HCl$ (9)

$CF_3CF_2CF_2CH_2CF_2OSO_2Cl + 3C_2H_5SH \longrightarrow$ $CF_3CF_2CF_2CH_2\overset{O}{\overset{\|}{C}}-SC_2H_5 + (C_2H_5S)_2SO_2 + 2HF + HCl$ As is apparent from the foregoing the new compounds of the invention $RCY_2CH_2CX_2OSO_2X$ are valuable intermediates for the production of α,α-dihydro, β,β-dihaloacyl compounds, i.e., halogenated acyl compounds having a methylene —$CH_2$— spacer between the acyl group and the halogenated portion of the molecule. Such α,α-dihydro halogenated acyl compounds have properties which are markedly different from those containing a halogenated carbon atom directly adjacent to the acyl group. In the former, the acyl group displays properties which are more characteristic of the corresponding hydrocarbon acyl compounds while in the latter, because of the strong electronegativity of the immediately adjacent halogen atoms (particularly when these are fluorine), the acyl group has markedly different properties from the hydrocarbon analogs. Thus, for example, the perfluorinated carboxylic acids $R_fCOOH$ where $R_f$ is perfluoroalkyl are virtually as strong as mineral acids while the α,α-dihydro perfluoro carboxylic acids $R_fCH_2COOH$ are much weaker acids.

A class of the new halosulfates which are of particular value are those of the general formula $$R_fCF_2CH_2CX_2OSO_2X$$

wherein $R_f$ is a perfluoroalkyl radical. Halosulfates of this type provide valuable intermediates for the preparation of 1,1-dihydro-perfluoroalkyl acyl compounds such as carboxylic acids, esters, amides and the like. The methylene, —$CH_2$— spacer between the perfluoroalkyl group and the acyl group has, as pointed out above, a highly significant effect on the properties of the acyl group. In the case of 1,1-dihydroperfluoroalkyl carboxylic acids, for example, the methylene spacer moderates the strength of the acid. Halosulfates of this type in which $R_f$ contains from about 4 to 14 carbon atoms are of particular value because of the unusual surface properties possessed by such compounds due to the extremely low surface energy of the perfluoroalkyl "tail." For example, the 1,1-dihydroperfluoroalkyl carboxylic acids in which the perfluoroalkyl group contains, e.g., from 6 to 12 carbon atoms and the salts and other water soluble derivatives thereof are excellent surfactants useful, for example for the emulsion polymerization of fluorinated olefins such as vinylidene fluoride, tetrafluoroethylene and chlorotrifluoroethylene.

Another group of the new halosulfates of the invention of particular value are those of the general formula $R'[CH_2CF_2]_nOSO_2X$ where $n$ is an integer from about 2 to 30 and preferably from about 2 to 10, and where $R'$ is a haloalkyl group which is preferably at least half halogenated and which preferably contains from 1 to about 6 carbon atoms. $R'$ is preferably perfluoroalkyl or perfluorochloroalkyl having from 1 to 6 carbon atoms. Halosulfates of this type, containing repeating vinylidene fluoride ($CH_2CF_2$) units are readily prepared from telomer iodides of vinylidene fluoride as set out in more detail below. Such halosulfates are particularly valuable as intermediates for the production of amides, e.g., by reaction with mono or diamines or esters, e.g., by reaction with mono or dihydroxy alcohols which in turn are useful, e.g., as functional fluids (i.e., hydraulic fluids, damping fluids and the like) or as plasticizers for fluorinated resins such as polyvinylidene fluoride or polyvinyl fluoride.

While the precursor halogenated iodides used to prepare the halosulfates of the invention may be obtained by any desired procedure, one convenient method for obtaining such iodides is by the reaction of a haloalkyliodide of the formula $RCX_2I$ where R is a haloalkyl group and X is chlorine or fluorine with a 1,1-dihydro-2,2-dihaloethylene (where the halogens are chlorine or fluorine). Such reactions may be carried out by heating the iodide $RCX_2I$ with the haloethylene under super-atmospheric pressures of, e.g., 300 to 1000 lbs./in.² at temperatures of, e.g., 150 to 250° C. and for reaction periods of, e.g., 1 to 24 hours. Reaction products (often called telomers) of the following types may be obtained with the olefins $CH_2=CF_2$, $CH_2=CCl_2$ and $CH_2=CFCl$:

$RCX_2I + CH_2=CF_2 \rightarrow RCX_2[CH_2CF_2]_nI$
$RCX_2I + CH_2=CCl_2 \rightarrow RCX_2[CH_2CCl_2]_nI$
$RCX_2I + CH_2CFCl \rightarrow RCX_2[CH_2CFCl]_nI$ where $n$ is an integer from 1 to about 30 and preferably from 1 to about 10.

The following are specific examples of typical chlorosulfates and fluorosulfates provided by the invention:

$CF_3CH_2CF_2OSO_2Cl$
$CF_2CH_2CF_2OSO_2F$
$CF_2ClCFClCH_2CF_2OSO_2Cl$
$CF_3CF_2CF_2CH_2CF_2OSO_2Cl$
$CF_3CH_2CCl_2OSO_2Cl$
$CF_3CH_2CFClOSO_2Cl$
$CF_3CCl_2CH_2CF_2OSO_2Cl$
$CF_2ClCCl_2CH_2CF_2OSO_2Cl$ $CF_3\overset{CF_3}{\underset{|}{C}}FCH_2CF_2OSO_2Cl$ $CF_2Cl\overset{CF_3}{\underset{|}{C}}FCH_2CF_2OSO_2Cl$ $CF_3-\overset{CF_3}{\underset{\underset{CF_3}{|}}{C}}-CH_2CF_2OSO_2Cl$ $CF_3\overset{CF_3}{\underset{|}{C}}F[CH_2CF_2]_2OSO_2F$ $CF_2Cl\overset{CF_3}{\underset{|}{C}}F[CH_2CF_2]_3OSO_2F$ $C_2F_5CF(CF_3)[CH_2CF_2]_3OSO_2Cl$ $CF_2ClCF(CF_3)[CH_2CF_2]_4OSO_2Cl$ $C_2F_6CF(CF_3)[CH_2CF_2]_2OSO_2F$ $CF_3\overset{CF_3}{\underset{|}{C}}F[CF_2]_3CH_2CF_2OSO_2Cl$ $C_3F_7[CF_2CF_2]_4CH_2CF_2OSO_2F$ In the preparation of the compounds of the invention by the reaction of corresponding halogenated iodides with chlorosulfonic or fluosulfonic acid, the reaction will be carried out at relatively low temperatures ranging from about −20 to about +50° C. and preferably from −10° to +30° C. Although higher temperatures may be employed, e.g., up to 150° C., it is generally not necessary to use temperatures above 50° C. because of the surprisingly high reactivity of this type of iodide with chlorosulfonic and fluosulfonic acid, and it is preferable to avoid higher temperatures because of the possibility of side reactions.

The reaction pressure is not critical. Thus, the reaction may be carried out at atmospheric pressure or even under slight vacuum, or if desired under any practical pressures ranging for example, up to 50,000 pounds per square inch. In most cases the reaction is conveniently carried out under atmospheric pressure.

The reaction time is likewise not critical. Reaction periods ranging from several minutes to several days may be used, although in the majority of cases, the reaction periods of from 2 to about 15 hours will be satisfactory.

The molar ratio of the chlorosulfonic or fluosulfonic acid to the iodide is not critical but should generally be in the range of from 1:1 to 20:1 and preferably in the range of about 2:1 to 10:1. Molar ratios of the chlorosulfonic or fluosulfonic acid to iodide of less than 1:1 are wasteful of the starting iodide. An excess of the chlorosulfonic acid is preferable to insure complete reaction of the iodide. In many cases it will be preferable to add the iodide slowly to an excess of the halosulfonic acid maintained at the desired reaction temperature or conversely.

The reaction may be conducted with or without a solvent. In general no solvent is required, although if desired halogenated solvents may be present.

Since some of the reactants, particularly the halosulfonic acids, and some of the reaction products, are corrosive, it is often preferable to conduct the reaction in glass or glass lined equipment or in metal equipment which is resistant to the corrosive influence of the reagents employed.

Since it is usually preferable to employ an excess of the halosulfonic acid, the reaction product will generally contain unreacted chlorosulfonic or fluosulfonic acid. The halosulfate may be separated from the halosulfonic acid by pouring the reaction mixture over crushed ice or into water held at 0° C. The halosulfonic acids being soluble in water will dissolve in the water and the halosulfates, being generally water insoluble, will separate as the lower organic layer. Use of low temperature to effect this separation is important both from the standpoint of avoiding excessive heating when the halosulfonic acid dissolves in water, and to avoid hydrolysis of the halosulfate. In some cases, if the halosulfate boils at a sufficiently different temperature from the corresponding halosulfonic acid, it can be removed from the mixture without water washing by a simple distillation, although this procedure is not usually preferred. Iodine which is also usually formed in the reaction can be removed from the halosulfate by filtration, by selective solvent extraction, or other well known techniques.

In some cases, the separation of crude halosulfate from the excess halosulfonic acid may be accomplished simply by permitting the reaction mixture to stand, whereupon it separates into two phases, an organic phase containing the crude halosulfate and an inorganic phase containing mostly unreacted halosulfonic acid, after which the halosulfate may be recovered by simple decantation.

The crude halosulfate, after separation from the excess halosulfonic acid as described may be further purified by distillation or other well known techniques.

In the case of the reaction of fluosulfonic acid with an iodide, hydrogen fluoride which is liberated in the processing of the reaction mixture, e.g. during hydrolysis, is sometimes not entirely removed when the reaction mixture is poured over crushed ice or into water held at 0° C. In some cases it may be desirable to follow the water wash with a rapid wash with dilute NaHCO$_3$ to remove residual hydrogen fluoride, while taking care to avoid hydrolysis of the fluosulfate.

The following examples are intended to illustrate specific embodiments of the invention:

*Example 1.—Reaction of* $C_2F_5CF(CF_3)[CH_2CF_2]_3I$ *with chlorosulfonic acid*

The above telomer iodide is prepared by reacting $$C_2F_5CF(CF_3)I$$

with $CH_2=CF_2$ at a temperature of about 200° C. following the procedures described in detail in U.S. Patent 2,975,220 of Murray Hauptschein et al.

50 grams (0.429 mole) of chlorosulfonic acid is placed in a 250 cc. 3 necked flask equipped with an addition funnel stirrer, thermometer, and gas inlet tube by means of which the apparatus is purged and maintained under a dry nitrogen atmosphere. 26 grams (0.0483 mole) of $C_2F_5CF(CF_3)(CH_2CF_2)_3I$ prepared as described above is added to the chlorosulfonic acid dropwise with stirring. During the addition, requiring 20 minutes, the temperature of the vigorous exothermic reaction is maintained at 4 to 5° C. by the use of an ice water bath. Solid crystalline iodine forms in the reaction mixture. The reaction mixture is stirred at 0° to 4° C. for 1.5 hours and cautiously hydrolyzed by drop by drop addition of 40 ml. of ice water. The lower organic layer is removed and combined with several 10 ml. portions of 1,1,2-trichlorotrifluoroethane used to extract the remaining aqueous layer. After drying and removal of the solvent by distillation, the residue is distilled in a small Vigreux distillation unit. From this fractionation there is recovered 4.5 grams (0.0084 mole) of the reactant iodide, and 18 grams (0.034 mole) of crude chlorosulfate $$C_2F_5CF(CF_3)(CH_2CF_2)_3OSO_2Cl$$

having a boiling point of 74 to 86° C. at about 0.1 mm. Hg. The conversion of the starting iodide to the chlorosulfate is 79%, and the yield of chlorosulfate based on converted iodide is 90%.

A fraction having a boiling point mainly at 80° C. at about 0.1 mm. Hg, and having a refractive index $n_D^{27}$ 1.352 is analyzed as follows:

Calculated for: $C_{10}H_6ClF_{15}O_3S$: C, 22.8; H, 1.1; Cl, 6.7; S, 6.1. Found: C, 23.2; H, 0.9; Cl, 6.3; S, 6.0.

The infrared spectra of this series of compounds $$C_2F_5CF(CF_3)(CH_2CF_2)_nOSO_2Cl$$

have a band at 6.94μ which is assigned to the —OSO$_2$— group.

*Example 2.—Reaction of*

$$CF_2ClCF(CF_3)(CH_2CF_2)_{4.5\ av}*I$$

*with chlorosulfonic acid*

18 grams (0.0299 mole) of $$CF_2ClCF(CF_3)(CH_2CF_2)_{4.5\ av}I$$

is placed in a three-necked flask, cooled in an ice bath, and equipped with a stirrer, thermometer, addition funnel and gas inlet tube for purging and maintaining a nitrogen atmosphere. This iodide was prepared by reacting $$CF_2ClCFICF_3$$

with $CH_2=CF_2$ at approximately 185° C. under about 4000 lbs./in.$^2$ gage pressure. Its preparation is described in more detail in U.S. Patent 2,975,220. To this iodide there is added very slowly 25 grams (0.215 mole) of chlorosulfonic acid. Crystalline iodine is liberated and sulfur dioxide is evolved during the addition as the chlorosulfate is formed. The temperature of the reaction mixture during the addition is 0° C., and stirring is continued for 2 hours.

Without working up the crude chlorosulfate, $$CF_2ClCF(CF_3)(CH_2CF_2)_{4.5\ av}OSO_2Cl$$

it is hydrolyzed by addition of water.

The lower organic layer is taken up in 1,1,2-trichlorotrifluoroethane, washed with dilute Na$_2$S$_2$O$_3$ solution, dried with anhydrous calcium sulfate, and distilled to remove solvent. From the residue there is separated by distillaton 12 grams (0.0256 mole) of a liquid having a boiling point ranging from 64° C. to greater than 126° C. at about 0.1 mm. Hg, representing about 85% yield and conversion based upon the starting iodide. This is shown

---

*av denotes "average" indicating a mixture of telomers in which the average number of vinylidene fluoride (CH$_2$CF$_2$) units is 4.5.

by infrared spectra to consist entirely of a mixture of fluorocarbon acid $$CF_2ClCF(CF_3)(CH_2CF_2)_{3.5\ av}CH_2COOH$$

and the acid fluoride

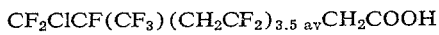

The acyl fluoride carbonyl absorption at $5.39\mu$ decreases progressively with increasing boiling point of the fractions. The fluorocarbon acid fluoride

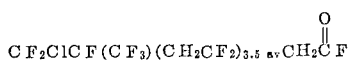

was characterized by formation of the amide

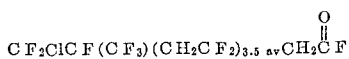

Anhydrous ammonia is passed through a solution of 7 grams (0.149 mole) of the acid fluoride in 50 ml. of anhydrous ether for 15 minutes. The solution is filtered, and the filtrate is distilled. After removal of the solvent there is obtained as the sole product 5.3 grams of the amide having a boiling point of from 156° to 162° C. at about 0.1 mm. Hg, and having a melting point of 49 to 50° C. after one recrystallization from 1,1,2-trichlorotrifluoroethane. The conversion based on starting acid fluoride is 76%. The amide is analyzed as follows:

Calculated for: $C_{12}H_{11}OF_{13}ClN$: C, 30.8; H, 2.4; N, 3.0. Found: C, 31.3; H, 2.7; N, 3.1.

*Example 3.—Reaction of $C_2F_5CF(CF_3)(CH_2CF_2)_2I$ with fluosulfonic acid*

To 40 grams (0.4 mole) of fluosulfonic acid stirred at 40° C. there is added drop by drop during one-quarter hour 10 grams (0.211 mole) of $$C_2F_5CF(CF_3)(CH_2CF_2)_2I$$

and stirring is continued at 40° C. for one and one quarter hours longer. Crystalline iodine and $SO_2$ are formed during the reaction. After cooling, the reaction mixture is hydrolyzed by cautiously pouring onto chipped ice. The lower organic layer is separated, washed once with 10% aqueous sodium bicarbonate solution and again with water. The crude liquid reaction products (9.5 grams) are dried with anhydrous calcium and magnesium sulfate and distilled in a small Vigreux distillation unit. There is obtained 7 grams (75% yield based on reacted iodide) of the fluorosulfate $C_2F_5CF(CF_3)(CH_2CF_2)_2OSO_2F$. The middle cut of this product has a boiling point of 114° C. at 100 mm. Hg. The infrared spectrum of this fluorosulfate has a strong absorption band at $6.75\mu$ (liquid) characteristic of the $-OSO_2F$ group. This compound is analyzed as follows:

Calculated for: $C_8H_4F_{14}O_3S$: C, 21.5; H, 0.90. Found: C, 21.1; H, 0.90.

*Example 4.—Reaction of*

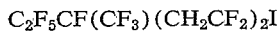

*with chlorosulfonic acid*

Following the procedures of Example 2, 25 grams of the iodide

(prepared by the addition of one mole of vinylidene fluoride to the iodide

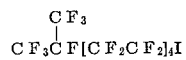

according to the procedures described in U.S. Patent 2,975,220) is reacted with a 10 fold molar excess of chlorosulfonic acid. The chlorosulfonic acid is added slowly to the iodide while the reaction mixture is maintained at a temperature of 0° C. by an ice bath and following the addition, stirring is continued for a period of 3 hours. The reaction mixture is poured rapidly over chipped ice and the aqueous mixture is extracted with $CF_2ClCCl_2F$. Upon drying of the extract over anhydrous magnesium sulfate and evaporation of the solvent, there is obtained a good yield of the chlorosulfate

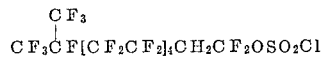

This compound displays marked surface activity due to the relatively long perfluorocarbon "tail." Upon hydrolysis of this compound there is obtained the 1,1-dihydroperfluorocarbon acid

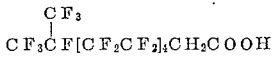

*Example 5.—Reaction of $CF_3CF_2CF_2CH_2CF_2I$ with chlorosulfonic acid*

To 25 grams of the iodide $CF_3CF_2CF_2CH_2CF_2I$ (prepared as described in U.S. Patent 2,975,220) there is added drop-wise with stirring under a nitrogen atmosphere 50 grams (0.43 mole) of chlorosulfonic acid over a period of 30 minutes. During the addtion the reaction mixture is maintained at a temperature of $-10$ to 0° C. Following the addition the reaction mixture is stirred for an additional 2 hours at $-10$ to $+10°$ C. The reaction mixture is then poured rapidly over chipped ice and the aqueous mixture then extracted with 50 milliliters of $CF_2ClCCl_2F$. The $CF_2ClCCl_2F$ extract is washed twice with 10 milliliter portions of water; the organic portion is separated from the aqueous portion in a separatory funnel and then dried over anhydrous magnesium sulfate. The $CF_2ClCCl_2F$ is evaporated to give a yield of 16 grams of the chlorosulfate $CF_3CF_2CF_2CH_2CF_2OSO_2Cl$ having a boiling point of 96° C. at 100 mm. Hg and a refractive index $n_D^{30}$ of 1.333.

*Analysis.*—$C_5H_2O_3SClF_9$: C, 17.23; H, 0.58; S, 9.20. Found: C, 17.72; H, 0.26; S, 9.30.

*Example 6.—Reaction of $CF_3CH_2CF_2I$ with chlorosulfonic acid*

Following the procedures of Example 5, 20 grams of the iodide $CF_3CH_2CF_2I$ (prepared by the addition of vinylidene fluoride to the iodide $CF_3I$ according to the procedure described in U.S. Patent 2,975,220) is reacted with a 10 fold molar excess of chlorosulfonic acid. Reaction is carried out at a temperature of 0° C. by adding the iodide slowly to chlorosulfonic acid under a nitrogen atmosphere. Following the reaction, the reaction mixture is poured over ice, and extracted with $CF_2ClCFCl_2$. The extract is washed, dried and upon evaporation of the solvent, there is obtained a good yield of the chlorosulfate $CF_3CH_2CF_2OSO_2Cl$.

We claim:

1. A compound of the formula $RCY_2CH_2CX_2OSO_2X$ where R is selected from the class consisting of fluorine, chlorine perfluoroalkyl, perfluorochloroalkyl, perfluorohydroalkyl and perfluorochlorohydroalkyl wherein said haloalkyl and halohydroalkyl groups have up to about 60 carbon atoms and a ratio of halogen atoms to other noncarbon atoms of at least 1:1; where Y is selected from the class consisting of chlorine, fluorine and perfluoroalkyl having 1 to 6 carbon atoms; and where X is selected from the class consisting of fluorine and chlorine.

2. A compound in accordance with claim 1 wherein R is perfluoroalkyl.

3. A compound in accordance wtih claim 1 in which R is perfluorochloroalkyl.

4. A compound in accordance with claim 1 in which R is perfluorohydroalkyl.

5. A compound of the formula $R_fCF_2CH_2CX_2OSO_2X$ where $R_f$ is perfluoroalkyl containing up to 6 carbon atoms and where X is selected from the class consisting of fluorine and chlorine.

6. A compound in accordance with claim 5 wherein $R_f$ contains from 4 to 14 carbon atoms.

7. A compound of the general formula $$R'[CH_2CF_2]_nOSO_2X$$

where R' is haloalkyl containing up to 6 carbon atoms wherein the ratio of halogen atoms to other non-carbon atoms is at least 1:1 and the halogen atoms of said haloalkyl are selected from the class consisting of fluorine and chlorine; where $n$ is an integer from 2 to 30 and where X is selected from the class consisting of fluorine and chlorine.

8. A compound in accordance with claim 7 wherein $n$ is an integer from 2 to 10.

References Cited by the Examiner

UNITED STATES PATENTS 2,628,972  2/1953  Calfee et al. _____ 260—456
2,878,156  3/1959  Davis _____ 260—456

CHARLES B. PARKER, *Primary Examiner.*